(12) United States Patent
Jeong et al.

(10) Patent No.: US 10,306,525 B2
(45) Date of Patent: *May 28, 2019

(54) METHOD AND APPARATUS FOR SUPPORTING HANDOVER OF USER EQUIPMENT IN MOBILE COMMUNICATION SYSTEM

(71) Applicant: Samsung Electronics Co., Ltd., Suwon-si, Gyeonggi-do (KR)

(72) Inventors: Kyeong-In Jeong, Hwaseong-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,758

(22) Filed: Feb. 23, 2015

(65) Prior Publication Data

US 2015/0172973 A1 Jun. 18, 2015

Related U.S. Application Data

(63) Continuation of application No. 13/574,397, filed as application No. PCT/KR2011/000345 on Jan. 18, 2011.

(30) Foreign Application Priority Data

Jan. 20, 2010 (KR) .................. 10-2010-0005231

(51) Int. Cl.
*H04L 5/00* (2006.01)
*H04W 36/00* (2009.01)
(Continued)

(52) U.S. Cl.
CPC ............ *H04W 36/08* (2013.01); *H04L 5/001* (2013.01); *H04L 5/0098* (2013.01);
(Continued)

(58) Field of Classification Search
CPC .... H04L 5/001; H04L 5/0094; H04W 74/006; H04W 36/0016
See application file for complete search history.

(56) References Cited

U.S. PATENT DOCUMENTS 6,496,551 B1 12/2002 Dam et al.
8,229,439 B2 7/2012 Du
(Continued)

FOREIGN PATENT DOCUMENTS

EP 2 154 903 A1 2/2010
KR 10-2007-0081013 A 8/2007
(Continued)

OTHER PUBLICATIONS

Catt, CC Management in CA, 3GPP TSG RAN WG2 Meeting #68, Nov. 9-13, 2009, pp. 1-6, R2-096499, Jeju, Korea.
(Continued)

*Primary Examiner* — Melanie Jagannathan
(74) *Attorney, Agent, or Firm* — Jefferson IP Law, LLP

(57) ABSTRACT

Defined is a handover procedure of a User Equipment (UE) for which multiple UpLink (UL) carriers requiring different UL Timing Advances (TAs) are aggregated in a mobile communication system. The handover procedure includes admitting execution of handover to a target cell of the UE at the request of a source cell, setting radio resource information to be used by the UE in the target cell and transmitting the set radio resource information to the source cell, determining whether a random access procedure, which is executed, among the multiple UL carriers, with a reference UL carrier or with an UL carrier to which the same UL TA as that of the reference UL carrier is applied, has been completed, and determining that a handover procedure of the UE has been successfully completed if the random access procedure has been completed, and determining that (Continued)

the handover procedure of the UE has failed if the random access procedure fails.

11 Claims, 12 Drawing Sheets

(51) Int. Cl.
  *H04W 36/08* (2009.01)
  *H04W 36/38* (2009.01)
  *H04W 56/00* (2009.01)
  *H04W 74/08* (2009.01)
(52) U.S. Cl.
  CPC ... *H04W 36/0033* (2013.01); *H04W 36/0072* (2013.01); *H04W 56/0045* (2013.01); *H04W 74/0833* (2013.01); *H04L 5/0007* (2013.01); *H04W 36/38* (2013.01)

(56) References Cited

U.S. PATENT DOCUMENTS

| | | | |
|---|---|---|---|
| 8,588,134 B2 | 11/2013 | Yamada et al. | |
| 8,620,335 B2 | 12/2013 | Lindstrom et al. | |
| 8,755,298 B2* | 6/2014 | Kim | H04W 74/006 370/252 |
| 8,879,485 B2* | 11/2014 | Chun | H04W 72/042 370/329 |
| 2006/0280142 A1 | 12/2006 | Damnjanovic et al. | |
| 2007/0275723 A1 | 11/2007 | Jeong et al. | |
| 2008/0232323 A1* | 9/2008 | Jeong | H04W 72/0406 370/331 |
| 2008/0261600 A1* | 10/2008 | Somasundaram | H04W 36/0055 455/436 |
| 2009/0061878 A1 | 3/2009 | Fischer | |
| 2009/0109838 A1* | 4/2009 | Kuo | H04W 76/027 370/216 |
| 2009/0156211 A1 | 6/2009 | Hande et al. | |
| 2009/0191874 A1* | 7/2009 | Du | H04W 36/18 455/436 |
| 2009/0274120 A1 | 11/2009 | Chou | |
| 2009/0310563 A1 | 12/2009 | Chou et al. | |
| 2010/0002883 A1* | 1/2010 | Sammour | H04L 63/1416 380/272 |
| 2010/0041405 A1 | 2/2010 | Gallagher et al. | |
| 2010/0208645 A1 | 8/2010 | Hamalainen et al. | |
| 2010/0234037 A1* | 9/2010 | Terry | H04L 1/0023 455/450 |
| 2010/0284367 A1* | 11/2010 | Koo | H04W 36/0055 370/331 |
| 2010/0285809 A1* | 11/2010 | Lindstrom | H04L 5/001 455/450 |
| 2010/0296389 A1* | 11/2010 | Khandekar | H04L 5/0007 370/216 |
| 2010/0317344 A1* | 12/2010 | Dalsgaard | H04W 74/02 455/436 |
| 2011/0028148 A1* | 2/2011 | Lee | H04L 5/001 455/435.2 |
| 2011/0080825 A1 | 4/2011 | Dimou et al. | |
| 2011/0103347 A1* | 5/2011 | Dimou | H04W 36/0016 370/331 |
| 2011/0134774 A1* | 6/2011 | Pelletier | H04W 52/365 370/252 |
| 2011/0170495 A1* | 7/2011 | Earnshaw | H04W 72/02 370/329 |
| 2011/0170535 A1* | 7/2011 | Wang | H04W 56/0045 370/350 |
| 2011/0235609 A1 | 9/2011 | Ahn et al. | |
| 2012/0026977 A1* | 2/2012 | Kim | H04W 36/0094 370/331 |
| 2012/0115468 A1 | 5/2012 | Lindoff et al. | |

FOREIGN PATENT DOCUMENTS

| | | | |
|---|---|---|---|
| WO | WO2008041115 | * | 4/2008 |
| WO | 2009/022880 A2 | | 2/2009 |

OTHER PUBLICATIONS

Huawei, CC Management Issues, 3GPP TSG-RAN2 #68 Meeting, Nov. 9-13, 2009, pp. 1-6, R2-096488, Jeju, Korea.

* cited by examiner

METHOD AND APPARATUS FOR SUPPORTING HANDOVER OF USER EQUIPMENT IN MOBILE COMMUNICATION SYSTEM

CROSS-REFERENCE TO RELATED APPLICATION(S)

This application is a continuation application of a prior application Ser. No. 13/574,397, filed on Jul. 20, 2012, which is a U.S. National Stage application under 35 U.S.C. § 371 of an International application filed on Jan. 18, 2011 and assigned application number PCT/KR2011/000345, which claimed the benefit of a Korean patent application filed on Jan. 20, 2010 in the Korean Intellectual Property Office and assigned Serial number 10-2010-0005231, the entire disclosure of which is hereby incorporated by reference.

TECHNICAL FIELD

The present invention generally relates to a mobile communication system, and more particularly, to a method and apparatus for supporting handover of a User Equipment (UE) for which multiple carriers are aggregated.

BACKGROUND ART

Generally, mobile communication systems have been developed to provide communication services while guaranteeing mobility of users. With the dramatic development of technologies, the mobile communication systems are now capable of providing high-speed data communication services as well as voice communication services. Recently, standardization work on Long Term Evolution (LTE), one of the next-generation mobile communication systems, is in progress in 3rd Generation Partnership Project (3GPP).

LTE is a technology for implementing packet-based communication at a higher data rate of a maximum of about 100 Mbps than a currently provided data rate, aiming at commercialization in around 2010. For data services, unlike in voice services, allocatable resources are determined according to an amount of transmission data and a channel status. Thus, in wireless communication systems such as mobile communication systems, a scheduler is in charge of management by allocating transmission resources considering an amount of the transmission resources, a channel status, and an amount of data. Such a scheme is also applied to the LTE which is one of the next-generation mobile communication systems, and a scheduler located in a base station manages and allocates wireless transmission resources.

In recent, active discussion has been going on about LTE-Advanced (LTE-A) communication systems which enhance a transmission speed by introducing various new technologies in the LTE communication systems. Carrier Aggregation (CA) is a representative one of the introduced new technologies. According to CA, unlike a conventional scheme where a User Equipment (UE) performs data transmission/reception by using a single downlink carrier and a single uplink carrier, a UE uses multiple downlink carriers and multiple uplink carriers. In this way, by allocating multiple carriers to a UE, the transmission speed and data rate of the UE can be increased.

FIG. 1 is a diagram illustrating the architecture of a general LTE mobile communication system.

Referring to FIG. 1, a radio access network of the LTE mobile communication system includes Evolved Node Bs (ENBs), also called Node Bs, 105, 110, 115, and 120, a Mobility Management Entity (MME) 125, and a Serving-Gateway (S-GW) 130.

A UE 135 accesses an external network through the ENBs 105, 110, 115, and 120, and the S-GW 130. The ENBs 105, 110, 115, and 120 correspond to entities in a form where conventional Node Bs of a Universal Mobile Telecommunications System (UMTS) and a Radio Network Controller (RNC) are combined with each other. The ENBs 105, 110, 115, and 120 are connected with the UE 135 over a wireless channel, and play more complex roles than the conventional Node Bs. In LTE, all user traffics including real-time services such as Voice over IP (VoIP) will be serviced over a shared channel. This means that there is a need for an apparatus of collecting status information of UEs and performing scheduling depending thereon, and the scheduling is managed by the ENBs 105, 110, 115, and 120. The ENBs 105, 110, 115, and 120 also control radio resources of cells. A single ENB typically controls multiple cells. To realize a data rate of a maximum of about 100 Mbps, LTE uses Orthogonal Frequency Division Multiplexing (OFDM) as radio access technology in a 20-MHz bandwidth. In addition, an Adaptive Modulation & Coding (AMC) scheme of determining a modulation scheme and a channel coding rate according to a channel status of UEs is applied to LTE. The S-GW 130 is a device for providing data bearers and creates or removes a data bearer under control of the MME 125. The MME 125 is a device in charge of various control functions and is connected with the multiple ENBs 105, 110, 115, and 120.

FIG. 2 is a diagram illustrating an embodiment of a UE for which multiple carriers are aggregated.

It is general that in a single base station, multiple carriers located in different frequency bands are transmitted and received. For example, when a DL carrier_1 201 having a center frequency F1 and a DL carrier_2 221 having a center frequency F4 are transmitted, a single UE conventionally receives data from one of the two carriers 201 and 221; whereas a UE having a Carrier Aggregation (CA) capability can receive data from several carriers at the same time. That is, the UE shown in FIG. 2 can receive data from both the DL carrier_1 201 and the DL carrier_2 221 at the same time. Also in case of uplink (UL) transmission, a UE conventionally transmits data through a single carrier; whereas a UE having the CA capability can transmit UL data through both a UL carrier_1 211 and a UL carrier_2 231 at the same time. The base station allocates more carriers to a UE having a carrier aggregation capability, depending on circumstances, thereby improving the transmission speed of the UE. Assuming that a single DL carrier and a single UL carrier form a single cell in a traditional sense, CA may be understood as simultaneous data transmission/reception of the UE through several cells. In this way, a conventional maximum transmission speed in a single cell can be increased proportionally to the number of carriers aggregated for the UE having the CA capability.

FIG. 3 is a diagram showing the necessity and roles of UL timing synchronization in an Orthogonal Frequency Division Multiplexing (OFDM) system.

OFDM is a multiplexing technique which divides a broadband frequency channel into multiple narrowband channels for transmission. OFDM is often used in a 3GPP LTE mobile communication system as a modulation technique.

Referring to FIG. 3, UE1 denotes a UE which is located in adjacent to an ENB and UE 2 denotes a UE which is located far from the ENB. T_pro1 denotes a propagation delay time in radio transmission to the UE1, and T_pro2 denotes a propagation delay time in radio transmission to the UE2. The UE1, because of being located nearer the ENB than the UE2, has a shorter propagation delay time. In FIG. 3, T_pro1 is equal to 0.33 µs and T_pro2 is equal to 3.33 µs.

In a cell of the ENB as shown in FIG. 3, when the UE1 and the UE2 are powered on or they are in the idle mode, a UL timing of the UE1, a UL timing of the UE2, and UL timings of UEs in a cell detected by the ENB do not match one another. Reference numeral 301 denotes a symbol for UL OFDM symbol transmission of the UE1, and reference numeral 302 denotes a symbol for UL OFDM symbol transmission of the UE2. Taking account of the propagation delay times of the UL transmissions of the UE1 and the UE2, timings for UL OFDM symbol reception of the ENB from the UE1 and the UE2 are 312 and 313. That is, the UL symbol 301 of the UE1 is received by the ENB at the timing 312 with a propagation delay time (T_pro1) of 0.333 µs, and the UL symbol 302 of the UE2 is received by the ENB at the timing 313 with a propagation delay time (T_pro2) of 3.33 µs. As shown in FIG. 3, since the timings 312 and 313 precede synchronizing the UL timing of the UE1 and the UL timing of the UE2, a start timing 311 for receiving and decoding an UL OFDM symbol by the ENB, the timing 312 for OFDM symbol reception from the UE1, and the timing 313 for the OFDM symbol reception from the UE2 are different from one another. The UL symbols transmitted from the UE1 and the U2 do not have orthogonality with respect to each other, thus acting as interference with each other, and the ENB cannot successfully decode the UL symbols 301 and 302 transmitted from the UE 1 and the UE2 due to the interference and the UL symbol reception timings 312 and 313 which do not match the start timing 311.

Therefore, an UL timing synchronization procedure is performed to synchronize the UL symbol reception timings of the UE1, the UE2, and the ENB, and upon completion of the UL timing synchronization procedure, the start timing 321 for receiving and decoding the UL OFDM symbol by the ENB, the timing 322 for UL OFDM symbol reception from the UE1, and the timing 323 for UL OFDM symbol reception from the UE2 match one another. By synchronizing the UL timings in this way, the UL symbols transmitted from the UE1 and the UE2 can maintain orthogonality, and thus the ENB can successfully decode the UL symbols transmitted from the UE1 and the UE2 according to the timing 301 and the timing 302.

The UL timing synchronization procedure for acquiring UL timing synchronization uses a random access procedure which is carried out in a target cell when a UE transits from a Radio Resource Control (RRC) idle mode to an RRC connected mode or after handover is performed.

FIG. 4 is a diagram illustrating an embodiment of the random access procedure for acquiring UL timing synchronization, carried out in a target cell after handover.

Referring to FIG. 4, reference numeral 401 denotes a UE, reference numeral 403 denotes a source cell where the UE 401 is located prior to handover, and reference numeral 405 denotes a handover target cell. The UE 401 first performs measurement report to the source cell in step 411. The measurement report involves measuring a channel status of a current cell and a channel status of a neighboring cell according to a configuration set by the ENB of the source cell 403, that is, a particular event or period-related information triggering the management report, and providing the ENB with the measurement result. The ENB makes a decision on the handover of the UE 401 in step 421. If the ENB of the source cell 403 decides to hand over the UE 401 to a target cell 405 in step 421, the ENB of the source cell 403 sends a handover command message to the UE 401 to instruct the UE 401 to hand over to the target cell 405 in step 431. The handover command message includes a cell ID information of the target cell 405 and radio channel reconfiguration information reconfigured for use by the UE 401 in the target cell 405. The radio channel reconfiguration information includes radio resource information to be used by the UE 401 in the target cell 405 and Cell Radio Network Temporary ID (C-RNTI) to be used in the target cell 405.

The UE 401, upon receiving the handover command message from the source cell 403 in step 431, sends a random access preamble, which is a code sequence, through a Random Access Channel (RACH) to the target cell 405 to synchronize a UL timing with the target cell 405 in step 441. The ENB for controlling the target cell 405 may know an UL Timing Advance (TA) between the UE 401 and the ENB through the random access preamble reception. The ENB provides the TA to the UE 401 in step 443, and the UE 401, upon receiving the TA, corrects an UL timing based on the TA and sends a handover confirm message indicating completion of the handover to the target cell 405 by using the corrected UL timing in step 451. Allocation of a UL radio resource for sending the handover confirm message may be notified when the UE 401 is informed of the UL TA in the target cell 405. After sending the handover confirm message, the UE 401 transmits and receives data to and from the target cell 405 in step 461.

FIG. 5 is a diagram illustrating an embodiment of a scenario of a UE for which multiple UL carriers requiring different UL TAs are aggregated.

Referring to FIG. 5, reference numeral 501 denotes an ENB, and reference numeral 511 denotes a UE for which multiple UL carriers F1 and F2 are aggregated. The UE 511, when performing UL transmission by using the UL carrier F1, transmits data directly to the ENB 501 as indicated by 531. When performing UL transmission by using the UL carrier F2, the UE 511 transmits data to the ENB 501 through a repeater 521 as indicated by 541. As a result, the UL transmission delay times to the ENB through the UL carrier F1 and the UL carrier F2 are different from each other, and thus UL TAs for the UL carrier F1 and the UL carrier F2 are also different from each other.

SUMMARY

As such, in case of the UE for which multiple UL carriers requiring different UL TAs are aggregated, multiple random access procedures for acquiring UL TA information for the UL carriers may be generated after UE's handover, making it impossible to apply a conventional handover procedure which performs a single random access procedure.

Accordingly, an aspect of the present invention is to provide an efficient handover method and apparatus for a UE for which multiple UL carriers requiring different UL Timing Advances (TAs) are aggregated.

According to an aspect of the present invention, there is provided a method for supporting handover of a User Equipment (UE) for which multiple UpLink (UL) carriers are aggregated in a mobile communication system. The method includes admitting execution of handover to a target cell of the UE at the request of a source cell, setting radio resource information to be used by the UE in the target cell and transmitting the set radio resource information to the source cell, determining whether a random access procedure, which is executed, among the multiple UL carriers, with a reference UL carrier or with an UL carrier to which the same UL Timing Advance (TA) as that of the reference UL carrier is applied, has been completed, and determining that a handover procedure of the UE has been successfully completed if the random access procedure has been completed, and determining that the handover procedure of the UE has failed if the random access procedure fails.

According to another aspect of the present invention, there is provided a method for performing handover by a User Equipment (UE) for which multiple UpLink (UL) carriers are aggregated in a mobile communication system. The method includes receiving a handover command message and executing multiple random access procedures for the multiple UL carriers, determining whether a random access procedure, which is executed, among the multiple UL carriers, with a reference UL carrier or with an UL carrier to which the same UL Timing Advance (TA) as that of the reference UL carrier is applied, has been completed, and determining that a handover procedure of the UE has been successfully completed and transmitting a handover confirm message to the target cell if the random access procedure has been completed, and determining that the handover procedure of the UE has failed and performing a connection reestablishment procedure to one of neighboring cells if the random access procedure fails.

According to another aspect of the present invention, there is provided an apparatus for supporting handover of a User Equipment (UE) for which multiple UpLink (UL) carriers are aggregated in a mobile communication system. The apparatus includes a handover controller for admitting execution of handover to a target cell of the UE at the request of a source cell, a radio resource manager for setting radio resource information to be used by the UE in the target cell and transmitting the set radio resource information to the source cell, and a message generator/interpreter for generating and interpreting a message transmitted and received with the source cell or the UE, and transmitting the corresponding result to the handover controller or the radio resource manager, wherein the handover controller determines whether a random access procedure, which is executed, among the multiple UL carriers, with a reference UL carrier or with an UL carrier to which the same UL Timing Advance (TA) as that of the reference UL carrier is applied, has been completed, determines that a handover procedure of the UE has been successfully completed if the random access procedure has been completed, and determines that the handover procedure of the UE has failed if the random access procedure fails.

According to another aspect of the present invention, there is provided a User Equipment (UE) for which multiple UpLink (UL) carriers are aggregated in a mobile communication system. The UE includes a radio transceiver for transmitting and receiving a message for executing multiple random access procedures for the multiple UL carriers, a message generator/analyzer for generating and analyzing the message transmitted and received by the radio transceiver, and a random access procedure executor for executing the multiple random access procedures for the multiple UL carriers, wherein the random access procedure executor determines whether a random access procedure, which is executed, among the multiple UL carriers, with a reference UL carrier or with an UL carrier to which the same UL Timing Advance (TA) as that of the reference UL carrier is applied, has been completed, determines that a handover procedure of the UE has been successfully completed and transmits a handover confirm message to the target cell if the random access procedure has been completed, and determines that the handover procedure of the UE has failed and performs a connection reestablishment procedure to one of neighboring cells if the random access procedure fails.

According to another aspect of the present invention, there is provided a method for supporting handover of a User Equipment (UE) for which multiple UpLink (UL) carriers are aggregated in a mobile communication system. The method includes admitting execution of handover to a target cell of the UE at the request of a source cell, setting radio resource information to be used by the UE in the target cell and transmitting the set radio resource information to the source cell, determining whether all of multiple random access procedures for the multiple UL carriers have been completed, and determining that a handover procedure of the UE has been successfully completed if all of the multiple random access procedures have been completed, and determining that the handover procedure of the UE has failed if at least one of the multiple random access procedures fails.

According to another aspect of the present invention, there is provided a method for performing handover by a User Equipment (UE) for which multiple UpLink (UL) carriers are aggregated in a mobile communication system. The method includes receiving a handover command message and executing multiple random access procedures for the multiple UL carriers, determining whether all of multiple random access procedures for the multiple UL carriers have been completed, and determining that a handover procedure of the UE has been successfully completed and transmitting a handover confirm message to the target cell if all of the multiple random access procedures have been completed, and determining that the handover procedure of the UE has failed and performing a connection reestablishment procedure to one of neighboring cells if at least one of the multiple random access procedures fails.

According to another aspect of the present invention, there is provided an apparatus for supporting handover of a User Equipment (UE) for which multiple UpLink (UL) carriers are aggregated in a mobile communication system. The method includes a handover controller for admitting execution of handover to a target cell of the UE at the request of a source cell, a radio resource manager for setting radio resource information to be used by the UE in the target cell, a message generator/interpreter for generating and interpreting a message transmitted and received with the source cell or the UE, and transmitting the corresponding result to the handover controller or the radio resource manager, wherein the handover controller determines that a handover procedure of the UE has been successfully completed if all of the multiple random access procedures have been completed, and determines that the handover procedure of the UE has failed if at least one of the multiple random access procedures fails.

According to another aspect of the present invention, there is provided a User Equipment (UE) for which multiple UpLink (UL) carriers are aggregated in a mobile communication system. The UE includes a radio transceiver for transmitting and receiving a message for executing multiple random access procedures for the multiple UL carriers, a message generator/analyzer for generating and analyzing the message transmitted and received by the radio transceiver, and a random access procedure executor for executing the multiple random access procedures for the multiple UL carriers, wherein the random access procedure executor determines that a handover procedure of the UE has been successfully completed and transmits a handover confirm message to the target cell if all of the multiple random access procedures have been completed, and determines that the handover procedure of the UE has failed and performs a connection reestablishment procedure to one of neighboring cells if at least one of the multiple random access procedure fails.

As is apparent from the aftergoing description, by providing a method for determining completion of a handover procedure based on execution of the multiple random access procedures in the handover of the UE for which multiple UL carriers requiring different UL TAs are aggregated, the handover procedure can be efficiently executed.

DESCRIPTION OF DRAWINGS

The above and other features and advantages of exemplary embodiments of the present invention will be more apparent from the following detailed description taken in conjunction with the accompanying drawings, in which.

DETAILED DESCRIPTION

Figure 1:
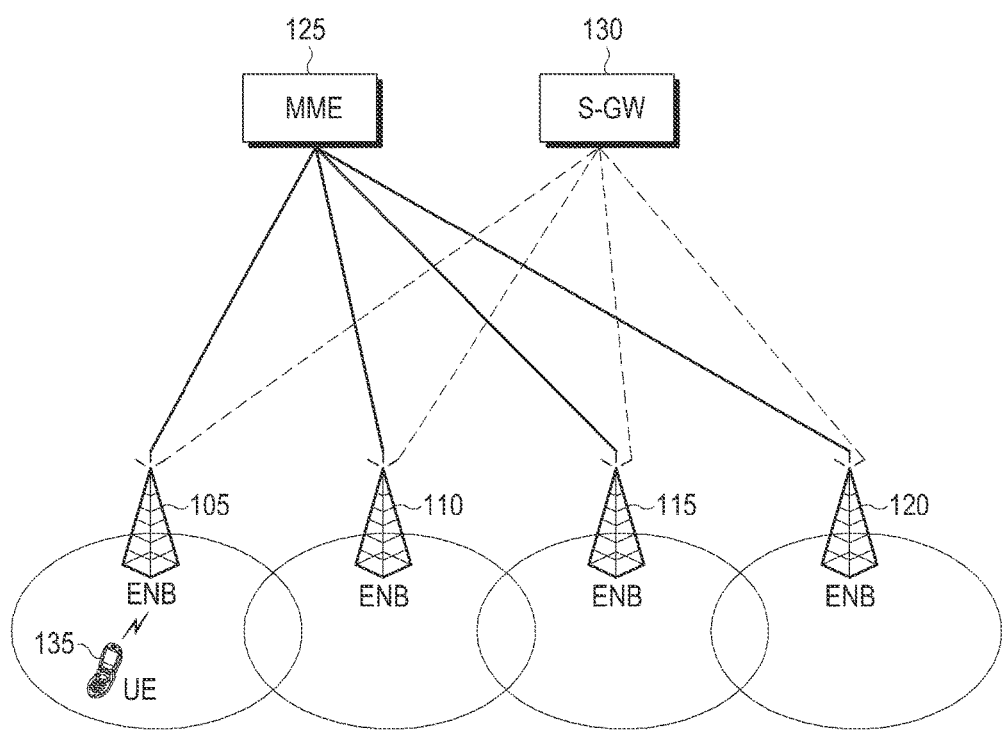
FIG. 1 is a diagram illustrating the architecture of a general 3GPP LTE mobile communication system.
Figure 2:
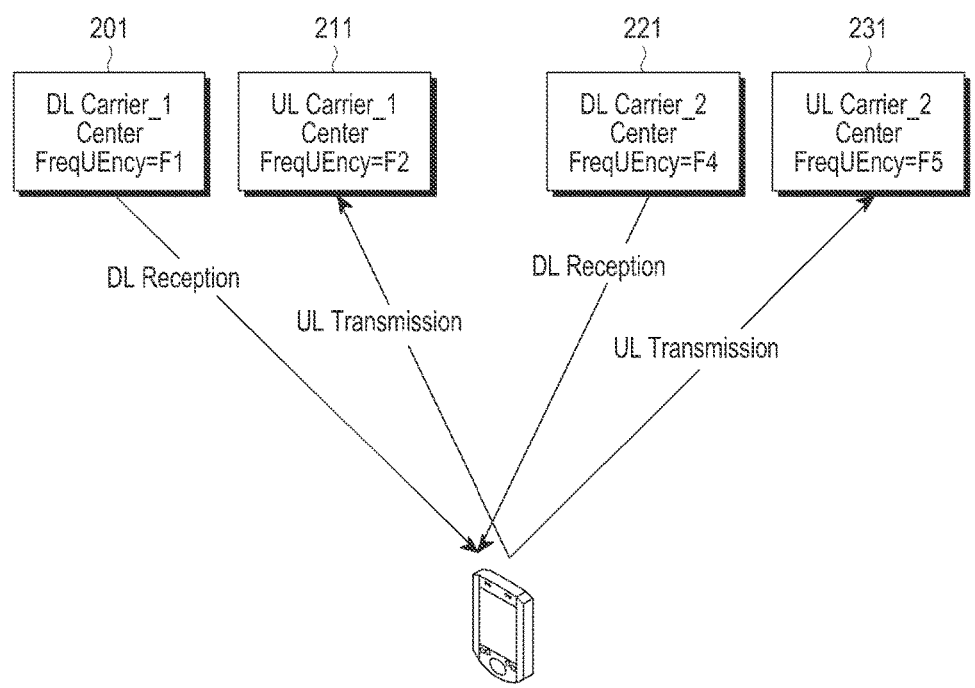
FIG. 2 is a diagram illustrating an embodiment of a UE for which multiple carriers are aggregated.
Figure 3:
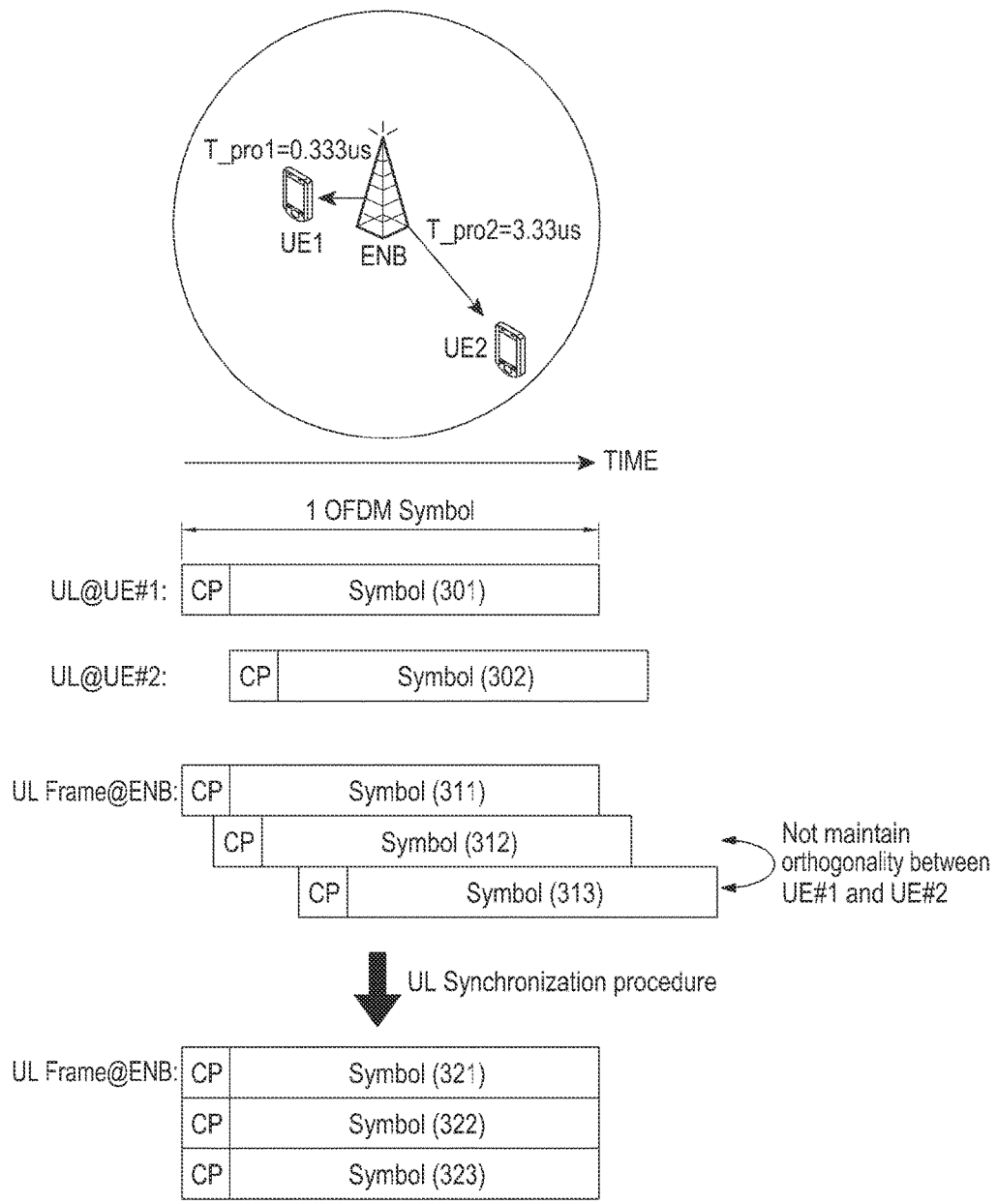
FIG. 3 is a diagram showing the necessity and roles of UL timing synchronization in an OFDM system.
Figure 4:
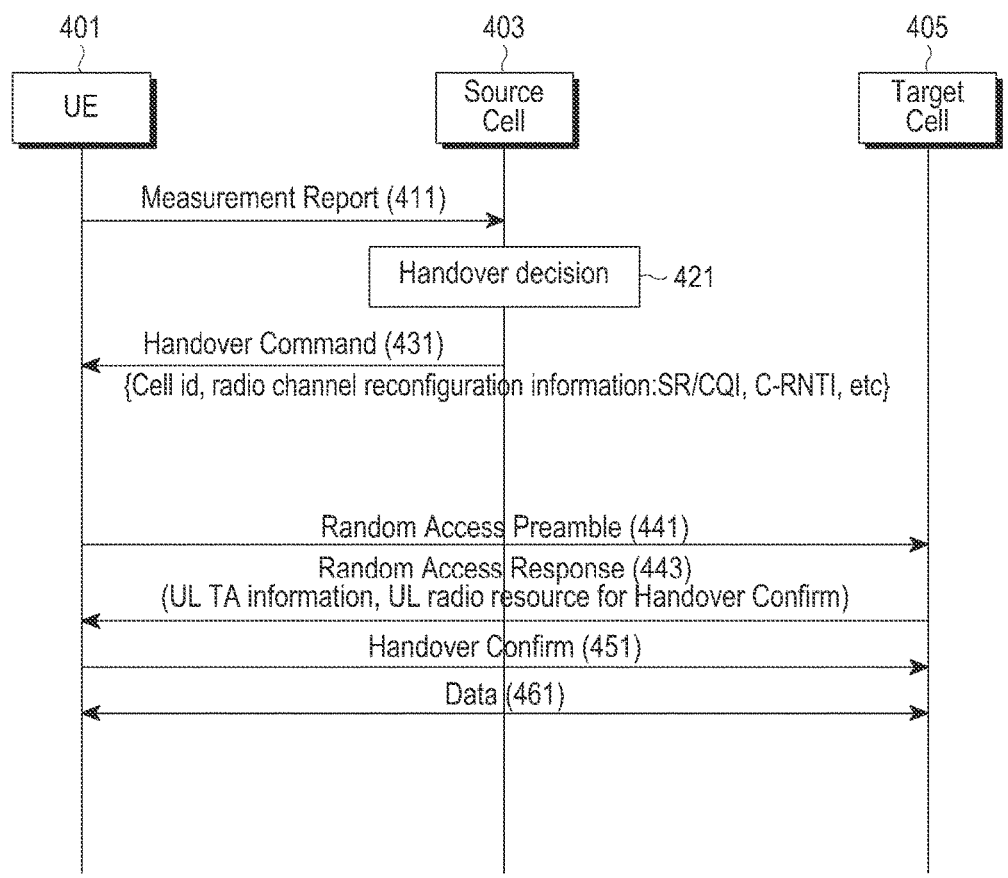
FIG. 4 is a diagram illustrating an embodiment of the random access procedure for acquiring UL timing synchronization, carried out in a target cell after handover.
Figure 5:
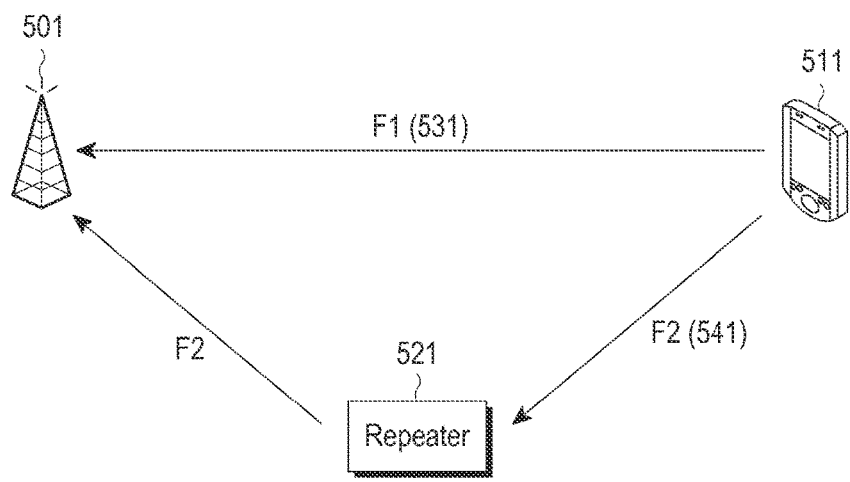
FIG. 5 is a diagram illustrating an embodiment of a scenario of a UE for which multiple UL carriers requiring different UL TAs are aggregated.

Exemplary embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention defines an efficient handover procedure of a User Equipment (UE) for which multiple UpLink (UL) carriers requiring different UL timing synchronization information are aggregated.

According to an embodiment of the present invention, in case of a UE for which multiple UL carriers requiring different UL timing synchronization information are aggregated, if multiple random access procedures for acquiring UL Timing Advance (TA) information for the aggregated multiple UL carriers, respectively, are generated after UE's handover, the UE regards the handover procedure as being successfully completed upon completion of the random access procedure for acquiring UL TA information of a reference/anchor UL carrier among the multiple UL carriers, and then transmits a handover confirm message. The reference/anchor UL carrier may be set using one of the following methods:

i) setting a reference/anchor UL carrier in a source cell prior to handover to the reference/anchor UL carrier;

ii) setting an UL carrier linked to a reference/anchor DownLink (DL) carrier in a source cell prior to handover to the reference/anchor UL carrier;

iii) setting an UL carrier, which is explicitly indicated as being set to the reference/anchor UL carrier through a handover command message for commanding execution of the handover, to the reference/anchor UL carrier;

iv) setting an UL carrier linked to a reference/anchor DL carrier, which is explicitly indicated as being set to the reference/anchor DL carrier through a handover command message for commanding execution of the handover, to the reference/anchor UL carrier;

v) setting an UL carrier, which is implicitly indicated as being set to the reference/anchor UL carrier through a handover command message for commanding execution of the handover, to the reference/anchor UL carrier (for example, setting a first signaled UL carrier among the signaled aggregated multiple UL carriers to the reference/anchor UL carrier); or vi) setting an arbitrary UL carrier for which UL TA information is first acquired by completion of the random access procedure before any other UL carrier to the reference/anchor UL carrier.

If the random access procedure for acquiring UL TA information of the particular reference/anchor UL carrier fails, the UE regards the handover procedure as failing and performs a connection reestablishment procedure corresponding to the handover failure.

The multiple random access procedures executed to acquire UL TA information for the aggregated multiple UL carriers after the handover may be generated simultaneously or sequentially, and the UE may execute UL transmission of only UL carriers for which UL TA information have been acquired by completion of the random access procedures. If the random access procedures for acquiring UL TA information for UL carriers other than the reference/anchor UL carrier fail, the UE releases/deactivates the UL carriers which fail in the random access procedures from the aggregated multiple UL carriers. With reference to the accompanying drawings, the handover procedure according to an embodiment of the present invention will be described in detail.

Figure 6:
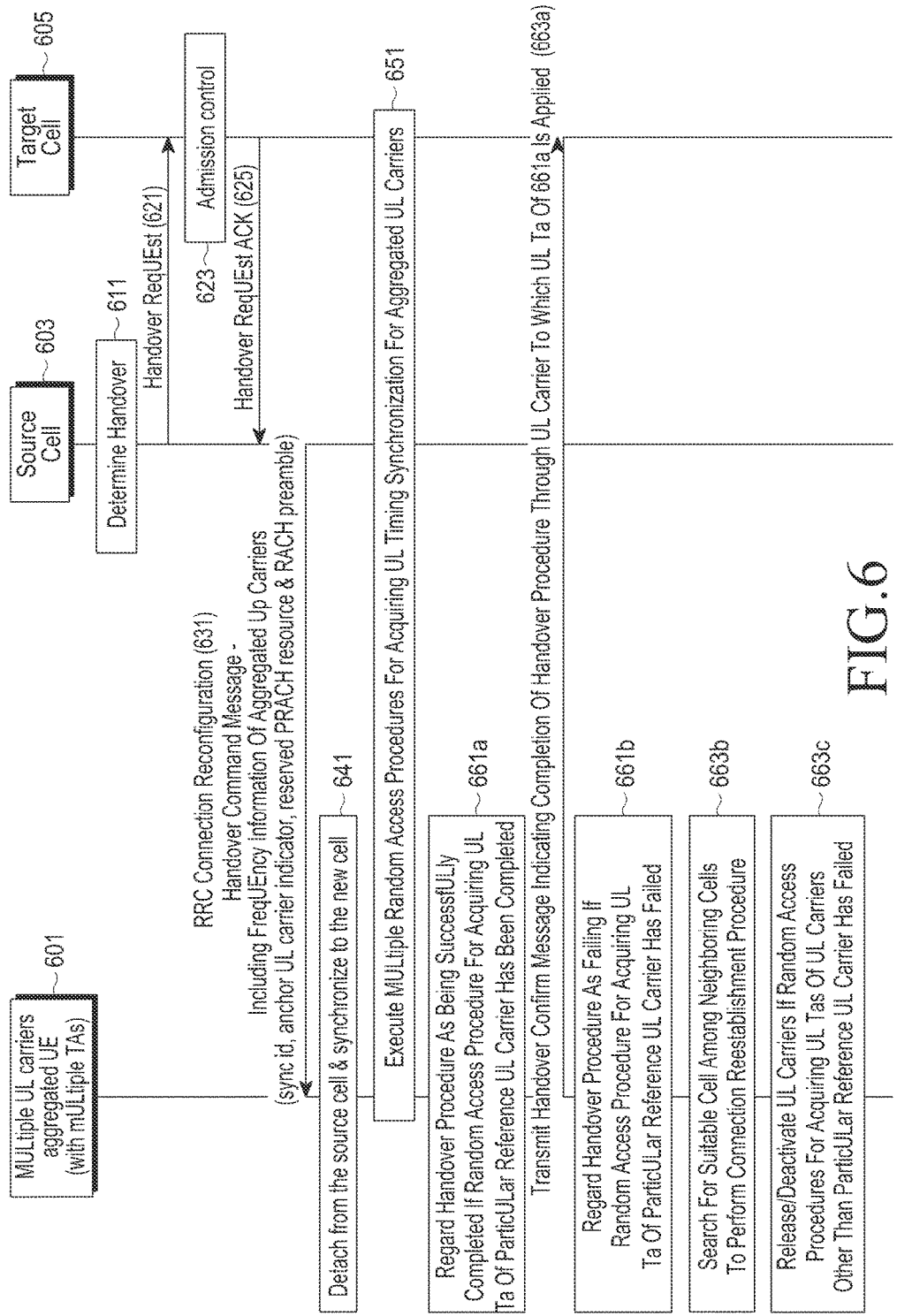
FIG. 6 is a diagram illustrating a handover procedure of a UE for which multiple UL carriers requiring different UL TAs are aggregated according to an embodiment of the present invention.

FIG. 6 is a diagram illustrating a handover procedure of a UE for which multiple UL carriers requiring different UL TAs are aggregated according to an embodiment of the present invention.

Referring to FIG. 6, reference numeral 601 denotes a UE for which multiple UL carriers requiring different UL TAs are aggregated, reference numeral 603 denotes a source cell prior to handover, and reference numeral 605 denotes a target cell to which the UE 601 is to hand over.

If an ENB for controlling the source cell 603 decides to execute handover of the UE 601 to the target cell 605 in step 611, the ENB for controlling the source cell 603 and an ENB for controlling the target cell 605 exchange control signals therebetween in steps 621 and 625, such that the ENB for controlling the target cell 605 admits execution of the handover of the UE 601 to the target cell 605 in step 623 and the source cell 603 then receives radio resource information to be used by the UE 601 in the target cell 605 in step 625. The received radio resource information is transmitted to the UE 601 through a handover command message transmitted by the ENB for controlling the source cell 603 to command the UE 601 to perform handover to the target cell 605 in step 631. The handover command message may be, for example, an Radio Resource Control (RRC) connection reconfiguration message in a 3GPP LTE mobile communication system, and information of the target cell 605 and the radio resource information to be used by the UE 601 in the target cell 605 may be included in 'mobilityControlInformation' of the RRC connection reconfiguration message.

The handover command message of the UE for which multiple UL carriers requiring different UL TAs are aggregated may include, as the radio resource information, frequency information of the aggregated multiple UL carriers, sync IDs, an anchor UL carrier indicator indicating the reference/anchor UL carrier, and reserved Packet Random Access Channel (PRACH) resource and RACH preamble information for the random access procedures of the UE.

The frequency information of the aggregated multiple UL carriers includes center frequency information of the aggregated multiple UL carriers, bandwidth information of the aggregated multiple UL carriers, and DL carriers linked with the multiple UL carriers.

The sync IDs indicate whether the same UL TA is applied or not. For example, when there are aggregated UL carriers F1, F2, and F3, among which the UL carriers F1 and F2 use the same sync ID and the UL carrier F3 uses a different sync ID, the same UL TA is applied to the UL carriers F1 and F2 and a different UL TA is applied to the UL carrier F3. The sync IDs may also be used as IDs indicating DL TAs of DL carriers linked with the UL carriers. In this case, the sync IDs may be included as part of information of the linked DL carriers rather than as part of information of the aggregated UL carriers, and the UL TAs of the aggregated UL carriers are determined based on whether DL sync IDs of the DL carriers linked with the UL carriers are the same as one another. In the foregoing example, if DL sync IDs of DL carriers linked with the UL carrier F1 and the UL carrier F2 are the same as each other, then the same UL TA is applied to the UL carrier F1 and the UL carrier F2, and if a DL sync ID of a DL carrier linked with the UL carrier F3 is different from those of the DL carriers linked with the UL carrier F1 and the UL carrier F2, then a different UL TA is applied to the UL carrier F3.

The anchor UL carrier indicator indicating the reference/anchor UL carrier may explicitly set a reference/anchor UL carrier used to determine whether the handover procedure has been completed.

The reserved PRACH resource and RACH preamble information indicates a PRACH resource and an RACH preamble for use in a random access procedure to be executed by the UE 601 after reception of the handover command message.

The UE 601, upon receiving the handover command message from the source cell 603, stops data transmission/reception with the source cell 603 and matches a DL TA with the target cell 605 in step 641. Since the multiple UL carriers requiring different UL TAs are aggregated for the UE 601, the UE 601 performs multiple random access procedures to match the UL TAs of the multiple UL carriers in step 651. The multiple random access procedures performed after reception of the handover command message may be generated simultaneously or sequentially, and the UE 601 may perform UL transmission of only UL carriers for which UL TA information have been acquired by completion of the random access procedures.

If the random access procedure for acquiring the UL TA of the reference/anchor UL carrier is finished during execution of the multiple random access procedures, the UE 601 regards the handover procedure as being successfully completed in step 661a, and sends a handover confirm message indicating completion of the handover procedure to the ENB of the target cell 605 through an UL carrier to which the UL TA acquired in step 661a is applied in step 663a. The reference/anchor UL carrier may be set using one of the above-described methods.

If the random access procedure for acquiring the UL TA of the reference/anchor UL carrier fails, the UE 601 regards the handover procedure as failing in step 661b, and searches for a suitable cell among neighboring cells to perform a connection reestablishment procedure corresponding to the handover failure in step 663b. The suitable cell may comply with, for example, a definition of a suitable cell provided in the standard TS36.304 of 3GPP LTE mobile communication systems.

If the random access procedures for acquiring the UL TAs of the UL carriers other than the reference/anchor UL carrier fail, the UE 601 releases/deactivates the UL carriers failing in the random access procedures from the aggregated multiple UL carriers in step 663c.

Figure 7:
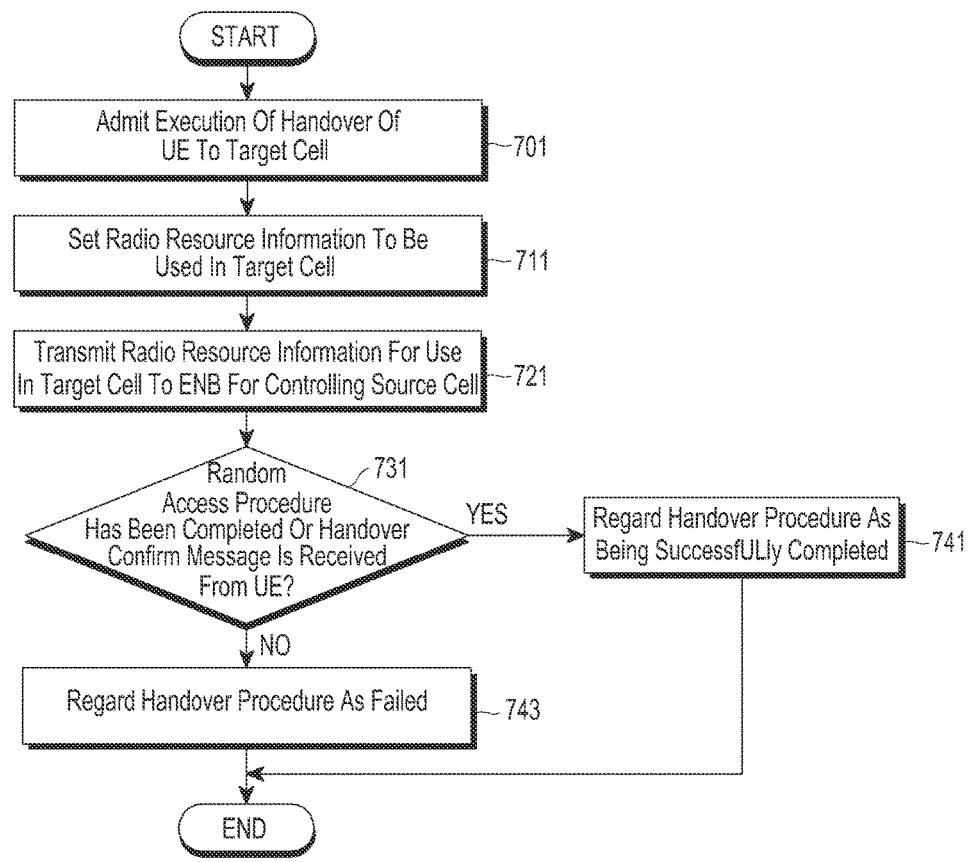
FIG. 7 is a flowchart illustrating operations of a network for a handover procedure according to an embodiment of the present invention.

FIG. 7 is a flowchart illustrating operations of a network, particularly, the ENB for controlling the target cell, during execution of the handover procedure according to an embodiment of the present invention.

The ENB for controlling the target cell receives a handover request message requesting handover of the UE for which multiple UL carriers requiring different UL TAs are aggregated to the target cell from the ENB for controlling the source cell, and admits execution of handover of the UE in step 701, and then sets radio resource information to be used by the UE in the target cell in step 711. The radio resource information is transmitted to the UE through the handover command message indicating that the ENB for controlling the source cell commands the UE to hand over to the target cell. The handover command message may be, for example, transmitted as an RRC connection reconfiguration message in a 3GPP LTE mobile communication system, and information of the target cell and the ratio resource information to be used by the UE in the target cell may be included in 'mobilityControlInformation' of the RRC connection reconfiguration message. The radio resource information may include frequency information of the aggregated multiple UL carriers, center frequency information of the aggregated multiple UL carriers, bandwidth information of the aggregated multiple UL carriers, sync IDs, an anchor UL carrier indicator indicating the reference/anchor UL carrier, and reserved Packet Random Access Channel (PRACH) resource and RACH preamble information for the random access procedures of the UE.

In step 721, the ENB of the target cell sends the radio resource information set in step 711 for use in the target cell to the ENB for controlling the source cell through a response message to the handover request message.

If a random access procedure executed with the reference/anchor UL carrier or another UL carrier applied with the same UL TA to acquire the UL TA of the reference/anchor UL carrier has been completed or the handover confirm message has been received from the UE in step 731, then the ENB of the target cell regards the handover procedure of the UE as being successfully completed, notifies the ENB for controlling the source cell of successful completion of the handover procedure, and performs message/data transmission/reception for the UE in the target cell in step 741. The UL message/data transmission in the target cell is limited to UL carriers to which UL TAs acquired by the successful random access procedures are applied.

Unless the random access procedure executed with the reference/anchor UL carrier or another UL carrier applied with the same UL TA to acquire the UL TA of the reference/anchor UL carrier has been completed or the handover confirm message has been received from the UE in step 731, then the ENB of the target cell regards the handover procedure of the UE as failing and releases radio resources previously allocated to the UE in step 743.

Figure 8:
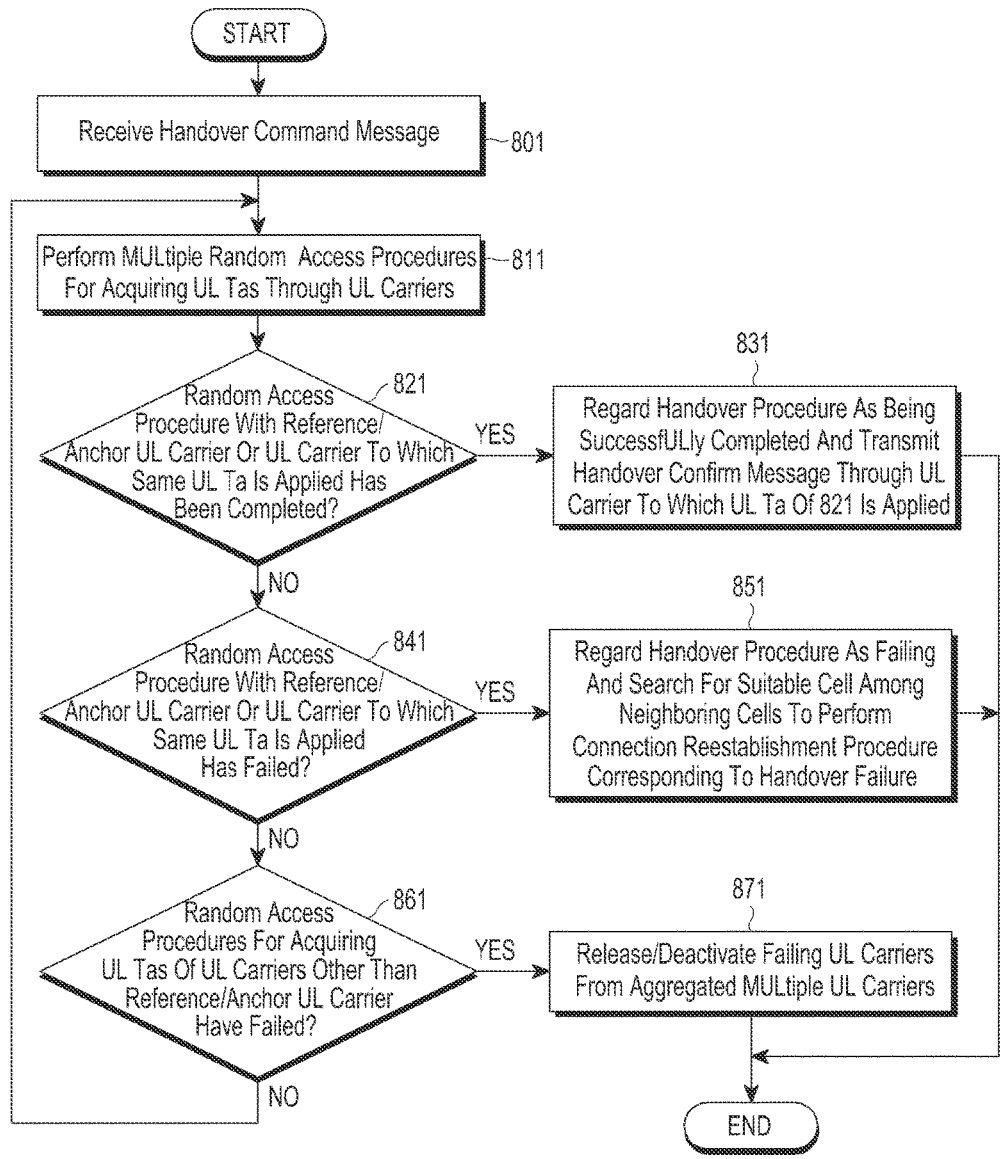
FIG. 8 is a flowchart illustrating operations of a UE for a handover procedure according to an embodiment of the present invention.

FIG. 8 is a flowchart illustrating operations of the UE according to an embodiment of the present invention.

When the UE receives the handover command message including multiple UL carriers requiring different TAs in step 801, the UE performs multiple random access procedures with corresponding UL carriers to match the UL TAs of the UL carriers in step 811. The multiple random access procedures executed after reception of the handover command message may be generated simultaneously or sequentially, and the UE may perform UL transmission of only UL carriers for which UL TA information have been acquired by completion of the random access procedures.

If a random access procedure executed with the reference/anchor UL carrier or another UL carrier applied with the same UL TA to acquire the UL TA of the reference/anchor UL carrier has been completed or the handover confirm message has been received from the UE in step 821, then the UE regards the handover procedure as being successfully completed and sends a handover confirm message indicating completion of the handover procedure to the UL carrier to which the UL TA acquired by completion of the random access procedure in step 821 is applied in step 831.

The reference/anchor UL carrier may be set using one of the above-described methods.

If the random access procedure executed with the reference/anchor UL carrier or another UL carrier applied with the same UL TA to acquire the UL TA of the reference/anchor UL carrier fails in step 841, the UE regards the handover procedure as failing, and searches for a suitable cell among neighboring cells to perform a connection reestablishment procedure corresponding to the handover failure in step 851. The suitable cell may comply with, for example, a definition of a suitable cell provided in the standard TS36.304 of 3GPP LTE mobile communication systems.

If random access procedures for acquiring UL TAs of the UL carriers other than the reference/anchor UL carrier fail in step 861, the UE releases/deactivates the UL carriers failing in the random access procedures from the aggregated multiple UL carriers in step 871.

Meanwhile, according to another embodiment of the present invention, in case of a UE for which multiple UL carriers requiring different UL TAs are aggregated, if multiple random access procedures for acquiring UL TAs of the aggregated multiple UL carriers are generated after reception of the handover command message, the UE regards the handover procedure as being successfully completed only when all of the multiple random access procedures are completed, and transmits the handover confirm message. If any one of the multiple random access procedures fails, the UE regards the handover procedure as failing and performs a connection reestablishment procedure corresponding to the handover failure. The multiple random access procedures to be executed after reception of the handover command message may be generated simultaneously or sequentially.

Figure 9:
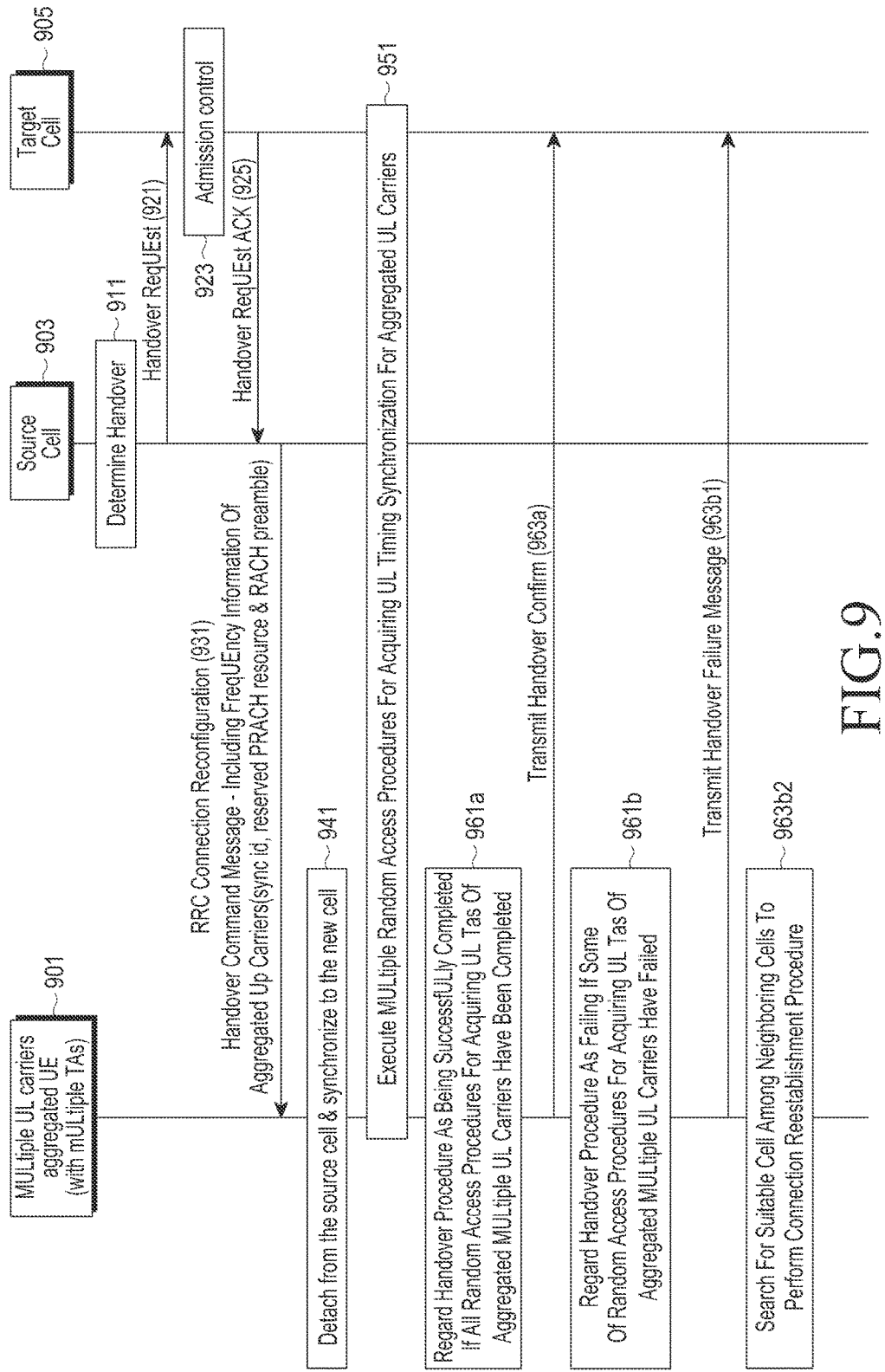
FIG. 9 is a diagram illustrating a handover procedure of a UE for which multiple UL carriers requiring different UL TAs are aggregated according to another embodiment of the present invention.

FIG. 9 is a diagram illustrating a handover procedure of a UE for which multiple UL carriers requiring different UL TAs are aggregated according to another embodiment of the present invention.

Referring to FIG. 9, reference numeral 901 denotes a UE for which multiple UL carriers requiring different UL TAs are aggregated, reference numeral 903 denotes a source cell prior to handover, and reference numeral 905 denotes a target cell to which the UE 901 is to hand over.

When an ENB for controlling the source cell 903 determines execution of handover of the UE 901 to the target cell 905 in step 911, the ENB for controlling the source cell 903 and an ENB for controlling the target cell 905 exchange control signals therebetween in steps 921 and 925, such that the ENB for controlling the target cell 905 admits execution of the handover of the UE 901 to the target cell 905 in step 923 and the source cell 903 then receives radio resource information to be used by the UE 901 in the target cell 905 in step 925. The received radio resource information is transmitted to the UE 901 through a handover command message transmitted by the ENB for controlling the source cell 903 to command the UE 901 to perform handover to the target cell 905 in step 931. The handover command message may be, for example, an Radio Resource Control (RRC) connection reconfiguration message in a 3GPP LTE mobile communication system, and information of the target cell 905 and the radio resource information to be used by the UE 901 in the target cell 905 may be included in 'mobilityControlInformation' of the RRC connection reconfiguration message.

The handover command message of the UE for which multiple UL carriers requiring different UL TAs are aggregated may include, as the radio resource information, frequency information of the aggregated multiple UL carriers, sync IDs, an anchor UL carrier indicator indicating the reference/anchor UL carrier, and reserved Packet Random Access Channel (PRACH) resource and RACH preamble information for the random access procedures of the UE.

The frequency information of the aggregated multiple UL carriers includes center frequency information of the aggregated multiple UL carriers, bandwidth information of the aggregated multiple UL carriers, and DL carriers linked with the multiple UL carriers.

The sync IDs indicate whether the same UL TA is applied or not. For example, when there are aggregated UL carriers F1, F2, and F3, among which the UL carriers F1 and F2 use the same sync ID and the UL carrier F3 uses a different sync ID, the same UL TA is applied to the UL carriers F1 and F2 and a different UL TA is applied to the UL carrier F3. The sync IDs may also be used as IDs indicating DL TAs of DL carriers linked with the UL carriers. In this case, the sync IDs may be included as part of information of the linked DL carriers rather than as part of information of the aggregated UL carriers, and the UL TAs of the aggregated UL carriers are determined based on whether DL sync IDs of the DL carriers linked with the UL carriers are the same as one another. In the foregoing example, if DL sync IDs of DL carriers linked with the UL carrier F1 and the UL carrier F2 are the same as each other, then the same UL TA is applied to the UL carrier F1 and the UL carrier F2, and if a DL sync ID of a DL carrier linked with the UL carrier F3 is different from those of the DL carriers linked with the UL carrier F1 and the UL carrier F2, then a different UL TA is applied to the UL carrier F3.

The reserved PRACH resource and RACH preamble information indicates a PRACH resource and an RACH preamble for use in a random access procedure to be executed by the UE 901 after reception of the handover command message.

The UE 901, upon receiving the handover command message from the source cell 903, stops data transmission/reception with the source cell 903 and matches a DL TA with the target cell 905 in step 941. Since the multiple UL carriers requiring different UL TAs are aggregated for the UE 901, the UE 901 performs multiple random access procedures to match the UL TAs of the multiple UL carriers in step 951. The multiple random access procedures performed after reception of the handover command message may be generated simultaneously or sequentially, and the UE 901 may perform UL transmission of only UL carriers for which UL TA information have been acquired by completion of the random access procedures.

If all of the multiple random access procedures have been completed and thus the UL TAs of all of the aggregated multiple UL carriers have been acquired, the UE 901 regards the handover procedure as being successfully completed in step 961*a*, and sends a handover confirm message indicating completion of the handover procedure to the ENB of the target cell 905 through any one of the UL carriers to which the acquired UL TAs are applied in step 963*a*. In this step, information about an UL carrier failing in handover may be carried through the handover confirm message.

If some of the multiple random access procedures for acquiring the UL TAs of the aggregated multiple UL carriers fail, the UE 901 regards the handover procedure as failing in step 961*b*. In this case, if there are some UL carriers for which UL TAs are acquired by completion of some random access procedures, the UE 901 transmits a handover failure message indicating the failure of the handover procedure to the ENB for controlling the target cell 905 through the UL carriers for which the UL TAs are acquired, in step 963*b*1. The handover failure message may include information about UL carriers for which UL TAs have been successfully acquired and information about UL carriers for which UL TAs have not been acquired. The ENB having received the handover failure message may reset radio resource information to be used by the UE 901 in the target cell 905 by using the information included in the handover failure message and notify the UE 901 of the reset radio resource information.

If none of the multiple random access procedures has been successfully completed and thus there is no UL carrier for which a UL TA is acquired, the UE 901 searches for a suitable cell among neighboring cells to perform a connection reestablishment procedure corresponding to the handover failure in step 963*b*2. The suitable cell may comply with, for example, a definition of a suitable cell provided in the standard TS36.304 of 3GPP LTE mobile communication systems.

Figure 10:
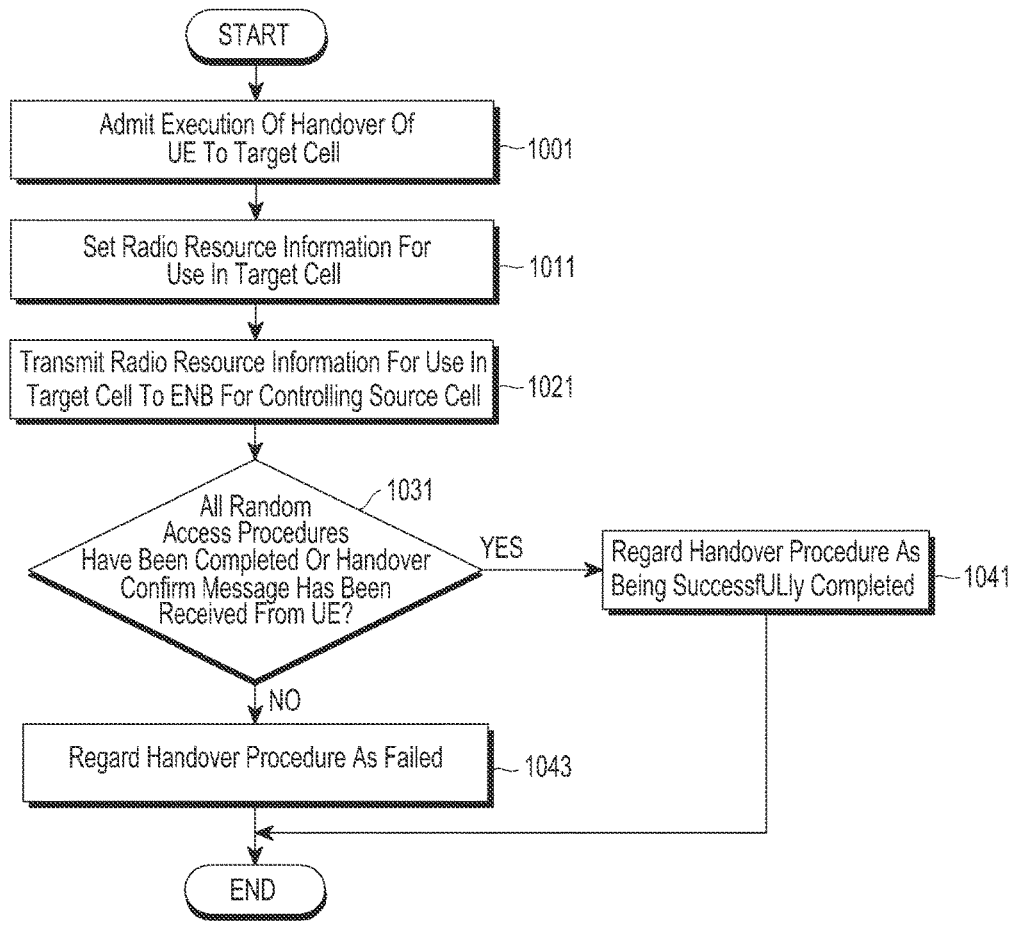
FIG. 10 is a flowchart illustrating operations of a network according to another embodiment of the present invention.

FIG. 10 is a flowchart illustrating operations of a network, particularly, the ENB for controlling the target cell, during execution of the handover procedure according to another embodiment of the present invention.

The ENB for controlling the target cell receives a handover request message requesting handover of the UE for which multiple UL carriers requiring different UL TAs are aggregated to the target cell from the ENB for controlling the source cell, and admits execution of the handover of the UE in step 1001, and then sets radio resource information to be used by the UE in the target cell in step 1011. The radio resource information is transmitted to the UE through the handover command message indicating that the ENB for controlling the source cell commands the UE to hand over to the target cell. The handover command message may be, for example, transmitted as an RRC connection reconfiguration message in a 3GPP LTE mobile communication system, and information of the target cell and the ratio resource information to be used by the UE in the target cell may be included in 'mobilityControlInformation' of the RRC connection reconfiguration message. The radio resource information may include frequency information of the aggregated multiple UL carriers, center frequency information of the aggregated multiple UL carriers, bandwidth information of the aggregated multiple UL carriers, sync IDs, an anchor UL carrier indicator indicating the reference/anchor UL carrier, and reserved Packet Random Access Channel (PRACH) resource and RACH preamble information for the random access procedures of the UE.

In step 1021, the ENB of the target cell sends the radio resource information set in step 1011 for use in the target cell to the ENB for controlling the source cell through a response message to the handover request message.

If some of the multiple random access procedures for acquiring the UL TAs of the aggregated multiple UL carriers fail or the handover confirm message has not been received from the UE 901 in step 1031, the UE 901 regards the handover procedure as failing and releases radio resources previously allocated to the UE in step 1043.

Although not shown in FIG. 10, the ENB of the target cell may receive the handover failure message from the UE as described above with reference to FIG. 9, and the ENB of the target cell having received the handover failure message may reset radio resource information to be used by the UE in the target cell by using the information included in the handover failure message (that is, information about UL carriers for which UL TAs have been successfully acquired and information about UL carriers for which UL TAs have not been acquired) and notify the UE of the reset radio resource information.

Figure 11:
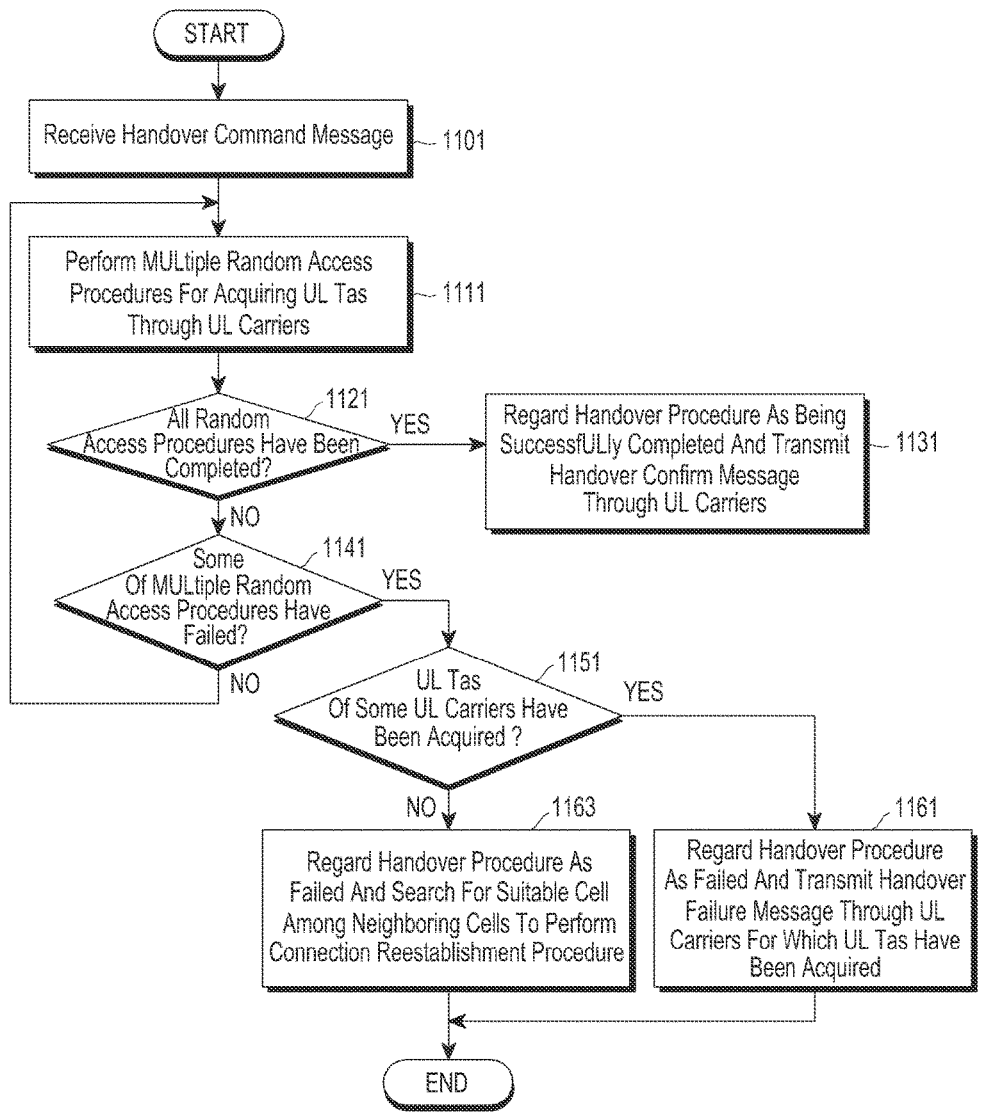
FIG. 11 is a flowchart illustrating operations of a UE according to another embodiment of the present invention.

FIG. 11 is a flowchart illustrating operations of the UE according to another embodiment of the present invention.

When the UE receives the handover command message including multiple UL carriers requiring different TAs in step 1101, the UE performs multiple random access procedures with corresponding UL carriers to match the UL TAs of the UL carriers in step 1111. The multiple random access procedures executed after reception of the handover command message may be generated simultaneously or sequentially, and the UE may perform UL transmission of only UL carriers for which UL TA information have been acquired by completion of the random access procedures.

If all of the multiple random access procedures have been completed in step 1121, the UE regards the handover procedure as being successfully completed and sends a handover confirm message indicating completion of the handover procedure through any one of the UL carriers to which the acquired UL TAs are applied, in step 1131. If some of the multiple random access procedures fail in step 1141, the UE determines whether some of the multiple random access procedures have been completed in step 1151.

If UL TAs for some UL carriers have been acquired by completion of some of the multiple random access procedures in step 1151, the UE regards the handover procedure as failing and sends a handover failure message through the UL carriers for which the UL TAs have been acquired, in step 1161. The handover failure message may include information about the UL carriers for which the UL TAs have been successfully acquired and information about the UL carriers for which the UL TAs have not been acquired.

If none of the multiple random access procedures has been successfully completed and thus there is no UL carrier for which a UL TA is acquired in step 1151, the UE regards the handover procedure as failing and searches for a suitable cell among neighboring cells to perform a connection reestablishment procedure corresponding to the handover failure in step 1163.

Figure 12:
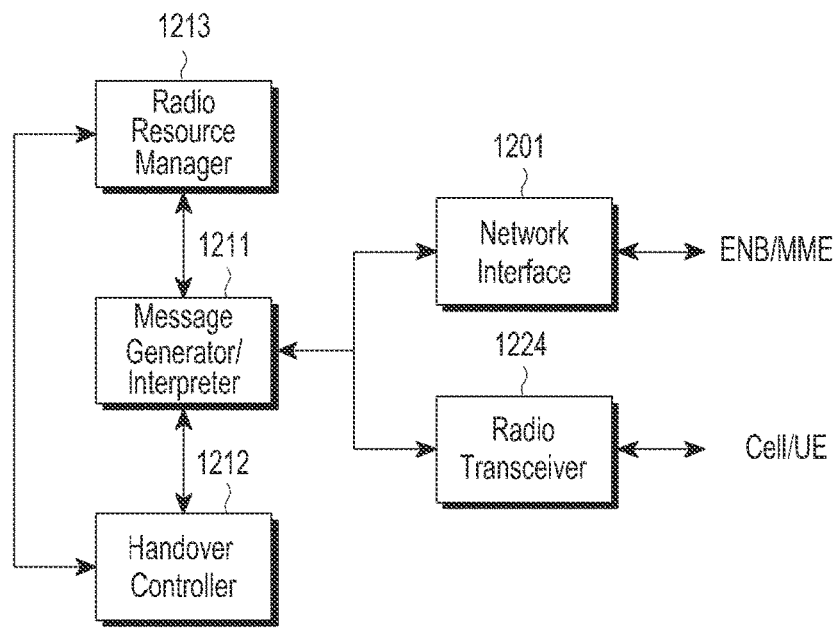
FIG. 12 is a block diagram of a network according to an embodiment of the present invention.

FIG. 12 is a block diagram of a network, particularly, the ENB for controlling the target cell, during execution of the handover procedure according to an embodiment of the present invention.

Referring to FIG. 12, the ENB performs communication with another ENB or a Mobility Management Entity (MME) through a network interface 1201, and a control message received through the network interface 1201 is interpreted by a message generator/interpreter 1211. If the ENB receives a handover request message from the ENB for controlling the source cell through the network interface 1201, the message generator/interpreter 1211 interprets the handover request message and sends the interpretation result to a handover controller 1212 which then determines whether to admit execution of handover to the target cell based on currently useful radio resource information. If the handover controller 1212 determines to admit execution of handover, it sets radio resource information to be used by the UE in the target cell and sends the set radio resource information to the message generator/interpreter 1211 which then generates a response message to the handover request message and transmits the response message to the ENB for controlling the source cell through the network interface 1201.

Message transmission/reception corresponding to random access procedures of the UE are performed by a radio transceiver 1224, such that a message to be transmitted by the radio transceiver 1224 is generated by the message generator/interpreter 1211, and a message received by the radio transceiver 1224 is interpreted by the message generator/interpreter 1211. The ENB of the target cell may detect successful completion or failure of the handover procedure of the UE by using the handover confirm message or the handover failure message received from the UE through the radio transceiver 1224. The ENB of the target cell may detect successful completion or failure of the handover procedure of the UE by detecting some or all of multiple random access procedures performed by the UE through the radio transceiver 1224 and the handover controller 1212.

Figure 13:
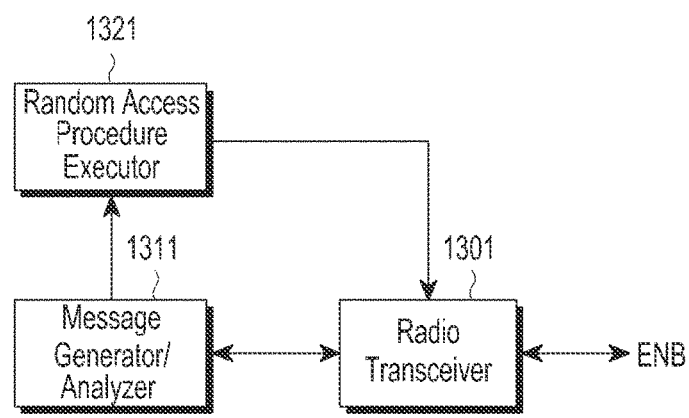
FIG. 13 is a block diagram of a UE according to an embodiment of the present invention.

FIG. 13 is a block diagram of a UE according to an embodiment of the present invention.

The UE, upon receiving the handover command message from the ENB through a radio transceiver 1301, analyzes information included in the handover command message at a message generator/analyzer 1311, and executes a random access procedure through a random access procedure executor 1321 in a target cell after handover. If information about multiple UL carriers requiring different UL TAs is included in the handover command message, the random access procedure executor 1321 simultaneously or sequentially executes the multiple random access procedures. The random access procedure executor 1321 determines successful completion or failure of the handover procedure according to successful completion or failure of a particular random access procedure among the multiple random access procedures or successful completion or failure of all of the multiple random access procedures, and the message generator/analyzer 1311 generates a message corresponding to successful completion or failure of handover according to the determination and transmits the message to the ENB through the radio transceiver 1301.

While exemplary embodiments of the present invention have been described in detail, the scope of the present invention is not limited to the embodiments and various changes and modifications of those of ordinary skill in the art using the basic concept of the present invention defined in the appended claims also fall within the scope of the present invention.

What is claimed is:

1. A method of a terminal in a communication system supporting a carrier aggregation, the method comprising:
   receiving, from a source base station, a radio resource control message to perform a handover, the radio resource control message including first configuration information on a random access channel (RACH) for a first uplink carrier, second configuration information on at least one RACH for at least one second uplink carrier, information indicating that the first uplink carrier is a reference uplink carrier, and a synchronization identification of each of at least one second uplink carriers among the at least one second uplink carrier;
   performing a random access procedure for the first uplink carrier among the first uplink carrier and the at least one second uplink carrier using the first configuration information based on the information indicating that the first uplink carrier is the reference uplink carrier;
   determining a successful completion of the handover of the terminal for which the first uplink carrier and the at least one second uplink carrier are aggregated based on the random access procedure for the first uplink carrier regardless of a random access procedure for the at least one second uplink carrier; and
   transmitting, to a target base station, a message to confirm the handover if the successful completion of the handover is determined,
   wherein the successful completion of the handover is determined if the random access procedure for the first uplink carrier is completed successfully, and
   wherein a same uplink timing advance is applied to second uplink carriers with a same synchronization identification.

2. The method of claim 1,
   wherein the first configuration information on the RACH for the first uplink carrier comprises radio resource information and preamble related information, and
   wherein the second configuration information on the at least one RACH for the at least one second uplink carrier comprises radio resource information and preamble related information.

3. The method of claim 1, further comprising deactivating the one or more second uplink carriers among the at least one second uplink carrier if a random access procedure for the one or more second uplink carriers using the second configuration information fails.

4. The method of claim 1,
   wherein the radio resource control message further comprises at least one of frequency information of the first uplink carrier and the at least one second uplink carrier, or frequency information of downlink carriers linked with the first uplink carrier and the at least one second uplink carrier.

5. A method of a base station in a communication system supporting a carrier aggregation, the method comprising:
obtaining first configuration information on a random access channel (RACH) for a first uplink carrier;
obtaining second configuration information on at least one RACH for at least one second uplink carrier; and
transmitting, to a terminal, a radio resource control message to perform a handover, the radio resource control message comprising the first configuration information, the second configuration information, information indicating that the first uplink carrier is a reference uplink carrier, and a synchronization identification of each of one or more second uplink carriers among the at least one second uplink carrier,
wherein a successful completion of the handover is determined based on a random access procedure for the first uplink carrier among the first uplink carrier and the at least one second uplink carrier, the determination of the successful completion of the handover being based on a successful completion of the random access procedure for the first uplink carrier regardless of whether the first uplink carrier and an uplink carrier of the one or more second uplink carriers have a same uplink timing advance or a different uplink timing advance, and
wherein the same uplink timing advance is applied to second uplink carriers with a same synchronization identification.

6. The method of claim 5,
wherein the first configuration information on the RACH for the first uplink carrier comprises radio resource information and preamble related information, and
wherein the second configuration information on the at least one RACH for the at least one second uplink carrier comprises radio resource information and preamble related information.

7. The method of claim 5, wherein the radio resource control message further comprises at least one of frequency information of the first uplink carrier and the at least one second uplink carrier, or frequency information of downlink carriers linked with the first uplink carrier and the at least one second uplink carrier.

8. A terminal in a communication system supporting a carrier aggregation, the terminal comprising:
a transceiver; and
a controller configured to:
receive, via the transceiver from a source base station, a radio resource control message to perform a handover, the radio resource control message comprising first configuration information on a random access channel (RACH) for a first uplink carrier, second configuration information on at least one RACH for at least one second uplink carrier, information indicating that the first uplink carrier is a reference uplink carrier, and a synchronization identification of each of one or more second uplink carriers among the at least one second uplink carrier,
perform, via the transceiver, a random access procedure for the first uplink carrier using the first configuration information based on the information indicating that the first uplink carrier is the reference uplink carrier,
determine a successful completion of the handover based on the random access procedure for the first uplink carrier among the first uplink carrier and the at least one second uplink carrier, the determination of the successful completion of the handover being based on a successful completion of the random access procedure for the first uplink carrier regardless of whether the first uplink carrier and an uplink carrier of the one or more second uplink carriers have a same uplink timing advance or a different uplink timing advance, and
transmit, via the transceiver to a target base station, a message to confirm the handover if the successful completion of the handover is determined,
wherein the same uplink timing advance is applied to second uplink carriers with a same synchronization identification.

9. The terminal of claim 8,
wherein the first configuration information on the RACH for the first uplink carrier comprises radio resource information and preamble related information, and
wherein the second configuration information on the at least one RACH for the at least one second uplink carrier comprises radio resource information and preamble related information.

10. The terminal of claim 8, wherein the controller is further configured to deactivate the one or more second uplink carriers among the at least one second uplink carrier if a random access procedure for the one or more second uplink carriers using the second configuration information fails.

11. The terminal of claim 8,
wherein the radio resource control message further comprises at least one of frequency information of the first uplink carrier and the at least one second uplink carrier, or frequency information of downlink carriers linked with the first uplink carrier and the at least one second uplink carrier.

* * * * *